(12) United States Patent
Liang et al.

(10) Patent No.: US 10,259,443 B2
(45) Date of Patent: Apr. 16, 2019

(54) HYBRID-ELECTRIC VEHICLE PLUG-OUT MODE ENERGY MANAGEMENT

(71) Applicant: Ford Global Technologies, LLC, Dearborn, MI (US)

(72) Inventors: Wei Liang, Farmington Hills, MI (US); Mark Steven Yamazaki, Canton, MI (US); Xiaoyong Wang, Novi, MI (US); Rajit Johri, Ann Arbor, MI (US); Ryan Abraham McGee, Ann Arbor, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1130 days.

(21) Appl. No.: 14/057,048

(22) Filed: Oct. 18, 2013

(65) Prior Publication Data
US 2015/0112522 A1 Apr. 23, 2015

(51) Int. Cl.
*B60W 10/06* (2006.01)
*B60W 10/08* (2006.01)
(Continued)

(52) U.S. Cl.
CPC .............. *B60W 10/06* (2013.01); *B60L 1/006* (2013.01); *B60L 1/02* (2013.01); *B60L 11/14* (2013.01);
(Continued)

(58) Field of Classification Search
None
See application file for complete search history.

(56) References Cited

U.S. PATENT DOCUMENTS 5,608,309 A * 3/1997 Hikita .................. H02J 7/1446
320/DIG. 10
5,864,770 A   1/1999 Ziph et al.
(Continued)

FOREIGN PATENT DOCUMENTS

JP      2004104936 A  *  4/2004
JP         4104940 B2  *  6/2008 ............ B60L 11/123
JP         4353093 B2  * 10/2009 ............ B60K 6/442

OTHER PUBLICATIONS

Chinese Patent Office, First Office Action for the corresponding Chinese Patent Application No. 201410557739.2, dated Nov. 29, 2017.

*Primary Examiner* — Shelley Chen
(74) *Attorney, Agent, or Firm* — David B. Kelley; Brooks Kushman P.C.

(57) ABSTRACT

A vehicle includes an engine, an electric machine, a battery, and at least one controller. The vehicle may further comprise a port for supplying power to a load external to the vehicle. The controller is programmed to operate the engine at a power level based on a difference between a battery voltage and a reference voltage such that a power output by the electric machine reduces the difference. The power level may define an engine operating point that minimizes fuel consumption. The operating point may be an engine torque and an engine speed. The power level may be further based on a state of charge of the battery. The electric machine may be operated to cause the engine to rotate at an engine speed corresponding to the selected power level. The difference may be caused by varying power drawn by a load external to the vehicle.

6 Claims, 3 Drawing Sheets

(51) Int. Cl.
*B60W 10/26* (2006.01)
*B60L 1/00* (2006.01)
*B60W 30/18* (2012.01)
*B60L 1/02* (2006.01)
*B60L 11/14* (2006.01)
*B60L 11/18* (2006.01)
*B60L 15/20* (2006.01)
*B60W 20/13* (2016.01)

(52) U.S. Cl.
CPC ....... *B60L 11/1816* (2013.01); *B60L 11/1861* (2013.01); *B60L 11/1868* (2013.01); *B60L 11/1877* (2013.01); *B60L 15/20* (2013.01); *B60W 10/08* (2013.01); *B60W 10/26* (2013.01); *B60W 20/13* (2016.01); *B60W 30/18054* (2013.01); *B60L 2210/10* (2013.01); *B60L 2210/30* (2013.01); *B60L 2210/40* (2013.01); *B60L 2240/12* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/441* (2013.01); *B60L 2240/443* (2013.01); *B60L 2240/527* (2013.01); *B60L 2240/545* (2013.01); *B60L 2240/547* (2013.01); *B60L 2240/549* (2013.01); *B60L 2260/22* (2013.01); *B60L 2270/12* (2013.01); *B60L 2270/142* (2013.01); *B60L 2270/145* (2013.01); *B60W 2510/085* (2013.01); *B60W 2710/244* (2013.01); *Y02T 10/6286* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/127* (2013.01); *Y02T 90/14* (2013.01); *Y02T 90/34* (2013.01); *Y10S 903/93* (2013.01)

(56) References Cited

U.S. PATENT DOCUMENTS

| | | |
|---|---|---|
| 6,104,160 A | 8/2000 | Iwata et al. |
| 6,488,107 B1 * | 12/2002 | Ochiai ............ B60K 6/48 180/65.25 |
| 6,724,100 B1 | 4/2004 | Gabriel |
| 6,984,946 B2 | 1/2006 | Donnelly et al. |
| 7,277,781 B2 | 10/2007 | Cawthorne et al. |
| 7,296,648 B2 | 11/2007 | Tatara et al. |
| 7,626,354 B2 * | 12/2009 | Hanyu ............ B60K 6/442 320/104 |
| 7,733,039 B2 | 6/2010 | Su |
| 7,741,805 B2 | 6/2010 | Zhang et al. |
| 7,779,616 B2 | 8/2010 | Sheidler et al. |
| 2004/0126306 A1 | 7/2004 | Ochiai et al. |
| 2005/0024001 A1 * | 2/2005 | Donnelly ............ B60L 3/102 318/66 |
| 2005/0045058 A1 * | 3/2005 | Donnelly ........... B60L 3/0046 105/26.05 |
| 2005/0264245 A1 * | 12/2005 | Donnelly ............ B60L 3/102 318/139 |
| 2006/0164034 A1 * | 7/2006 | Hanyu ............ B60K 6/442 320/104 |

* cited by examiner

HYBRID-ELECTRIC VEHICLE PLUG-OUT MODE ENERGY MANAGEMENT

TECHNICAL FIELD

This application relates to control of a hybrid vehicle powertrain to provide power to external devices.

BACKGROUND

Hybrid vehicles combine traditional fuel-powered engines with electric motors to improve fuel economy. To achieve better fuel economy, a hybrid vehicle includes a traction battery that stores energy for use by the electric motors. During normal operation, the state of charge of the battery may fluctuate. The battery may be charged by controlling the engine and a generator to provide power to the battery. Additionally, a plug-in hybrid may recharge the battery by plugging in to an external power supply.

A hybrid vehicle may also be adapted to provide power to loads external to the vehicle. The vehicle may have a plug-out mode where an external load can be connected to the vehicle. In the plug-out mode, the vehicle provides power to the external load. One possible application may be to provide electrical power to a house as a backup generator. For example, the vehicle power bus may be connected to an external inverter that converts DC voltage to an AC voltage compatible with household devices. The traction battery may provide the power or the engine may be operated to drive a generator to provide the external power.

SUMMARY

A vehicle includes an engine, a battery with terminals, and an electric machine. The vehicle further includes at least one controller programmed to, in response to a difference between a voltage across the terminals and a reference voltage in the absence of a demand for propulsive power, operate the engine at an operating point selected based on the difference such that a power output by the electric machine reduces the difference. The operating point may be selected such that, for the power output by the electric machine, fuel consumption by the engine is generally minimized. The operating point may define a torque command and a speed command for the engine. The operating point may be further selected based on a state of charge of the battery such that the power output by the electric machine generally maintains the state of charge of the battery. The operating point may be further selected based on a state of charge difference between a state of charge of the battery and a predetermined state of charge such that the power output by the electric machine reduces the state of charge difference. The at least one controller may be further programmed to operate the electric machine to cause the engine to rotate at an engine speed defined by the operating point.

A vehicle includes an engine, and an electric machine mechanically coupled to the engine and electrically coupled to a traction battery. The vehicle further includes at least one controller programmed to, in response to a difference between a voltage associated with the traction battery and a reference voltage in the absence of a demand for propulsive power, operate the engine to drive the electric machine to output power at a level sufficient to reduce the difference such that fuel consumed by the engine is generally minimized for the level. The level may correspond to a predetermined engine operating point. The voltage associated with the traction battery may be a terminal voltage of the traction battery. The level may be further sufficient to maintain a state of charge of the traction battery. The level may be further sufficient to charge the traction battery to a predetermined state of charge. The vehicle may further include a port electrically coupled to the traction battery and configured to provide power from the traction battery or the electric machine to an external load electrically connected therewith. The voltage associated with the traction battery may be a voltage measured at the port.

A method of controlling a vehicle by at least one controller includes selecting a power level for an electric machine based on a difference between a voltage of a high-voltage bus and a reference voltage. The method further includes selecting an operating point for an engine that generally minimizes fuel consumption at the selected power level. The method further includes operating the engine at the operating point to drive the electric machine to produce the selected power to reduce the difference. The selected power level may further maintain a state of charge of a traction battery electrically connected to the high-voltage bus. The selected power level may further drive a state of charge of a traction battery electrically connected to the high-voltage bus to a predetermined state of charge. The selecting and operating may be performed in the absence of a demand for propulsive power.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
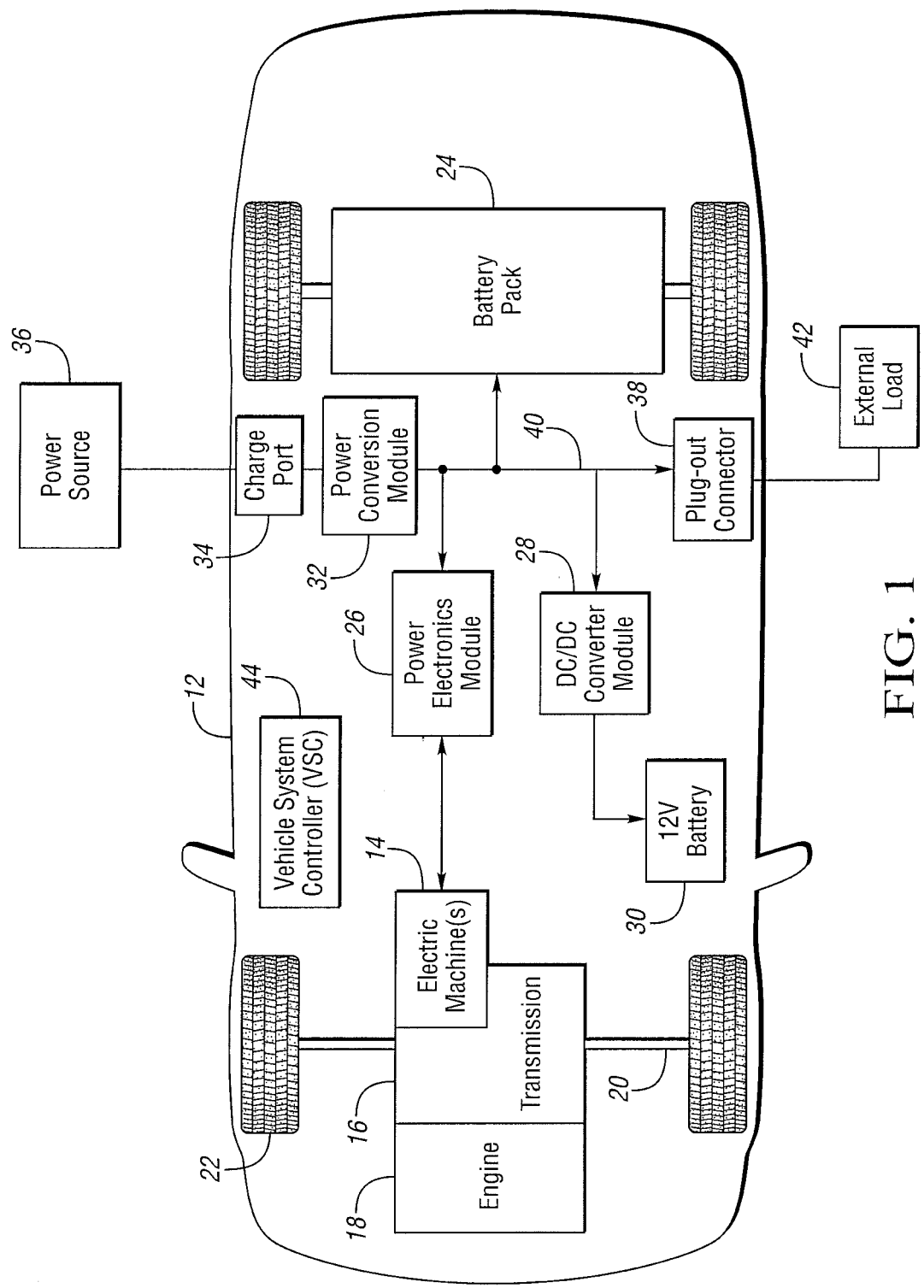
FIG. 1 is a diagram of a plug-in hybrid-electric vehicle illustrating typical drivetrain and energy storage components.

FIG. 1 depicts a typical hybrid-electric vehicle (HEV). A typical hybrid-electric vehicle 12 may comprise one or more electric machines 14 mechanically connected to a hybrid transmission 16. The electric machines 14 may be operable as a motor and a generator. In addition, the hybrid transmission 16 is mechanically coupled to an engine 18. The hybrid transmission 16 may also be mechanically coupled to a drive shaft 20 that is mechanically coupled to the wheels 22. The electric machines 14 may provide propulsion and deceleration capability when the engine 18 is turned on or off. The electric machines 14 may act as generators and can provide fuel economy benefits by recovering energy that would normally be lost as heat in the friction braking system. The electric machines 14 may also provide reduced pollutant emissions since the hybrid electric vehicle 12 may be operated in an all-electric mode under certain conditions.

In certain modes of operation, at least one of the electric machines 14 may act as an onboard generator. The shaft of the electric machine 14 may be driven by the engine 18, either directly or through the hybrid transmission 16. The power output of the engine 18 is a function of the engine torque and the engine speed. The mechanical energy created by the engine 18 may be converted to electrical energy through the electric machine 14 acting as a generator. The power output by the electric machine 14 is a function of the electric machine speed and the electric machine torque.

The battery pack 24 stores energy that can be used by the electric machines 14. A vehicle battery pack or traction battery 24 typically provides a high voltage DC output. A high-voltage bus 40 may be defined for connecting loads requiring high-voltage. The battery pack 24 may be electrically coupled to the high-voltage bus 40 to provide power to and receive power from the high-voltage bus 40. The high-voltage bus 40 may represent a connection point for loads that require a connection to high-voltage power. One or more power electronics modules 26 may be electrically connected to the high-voltage bus 40 and may be configured to provide power to and receive power from the high-voltage bus 40. The power electronics module 26 may be electrically connected to the electric machines 14 and provides the ability to bi-directionally transfer energy between the high-voltage bus 40 and the electric machines 14. For example, a typical battery pack 24 may provide a DC voltage while the electric machines 14 may require a three-phase AC current to operate. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the battery pack 24.

In addition to providing energy for propulsion, the battery pack 24 may provide energy for other vehicle electrical systems. A typical system may include a DC/DC converter module 28 that converts the high-voltage DC output of the battery pack 24 to a low-voltage DC supply that is compatible with other vehicle loads. The DC/DC converter module 28 may be electrically connected to the high-voltage bus 40 and be configured to provide power to and receive power from the high-voltage bus 40. Other high-voltage loads, such as compressors and electric heaters, may be connected directly to the high-voltage bus 40. In a typical vehicle, the low-voltage systems are electrically connected to an auxiliary battery (e.g., 12V) 30. The auxiliary battery 30 is depicted as a 12V battery but may be at any voltage suitable for the particular application (e.g., 24V, 48V, etc.). An all-electric vehicle may have a similar architecture but without the engine 18 and a modified transmission 16.

The vehicle may be a plug-in HEV in which the battery pack 24 may be recharged by an external power source 36. The external power source 36 may provide AC or DC power to the vehicle 12 by electrically connecting through a charge port 34. The charge port 34 may be any type of port configured to transfer power from the external power source 36 to the vehicle 12. The charge port 34 may be electrically connected to a power conversion module 32. The power conversion module 32 may condition the power from the external power source 36 to provide the proper voltage and current levels to the battery pack 24. In some applications, the external power source 36 may be configured to provide the proper voltage and current levels to the battery pack 24 and the power conversion module 32 may not be necessary. The functions of the power conversion module 32 may reside in the external power source 36 in some applications.

One or more controllers may be present in the vehicle to control the operation of the various components. A Vehicle System Controller (VSC) 44 is shown as part of the vehicle. Other controllers are not shown in the figures. The controllers may communicate with one another in any appropriate manner. A communications bus may be a wired connection that connects the controllers of the vehicle 12 such that the data may be transmitted and received between controllers. The communications bus may be a serial bus, such as a controller area network (CAN). Communications may also be via discrete hardware signals between controllers. A combination of serial and discrete communication signals may also be utilized.

For example, the various components within the vehicle may each have an associated controller. The engine 18 may have an associated controller to control and manage operation of the engine 18. The engine controller may monitor signals associated with the engine 18 such as engine speed and engine torque. The engine controller may control various aspects of the engine 18 operation.

The transmission 16 may have an associated controller to control and manage operation of the transmission 16. The transmission controller may monitor signals associated with the transmission 16 such as transmission output speed, fluid level, and gear positions. The transmission controller may control various aspects of the transmission 16 operation.

The Power Electronics Module 26 may have an associated controller to control and manage operation of the module and the electric machines 14. The power electronics controller may monitor signals associated with the electric machines 14, such as speed, current, voltage, and temperature. The power electronics controller may also monitor signals associated with the power electronics such as the DC bus voltage. The power electronics controller may also control various aspects of the electric machine 14 operation.

The battery pack 24 may have an associated controller to manage and control the operation of the battery pack 24. The battery controller may monitor signals associated with the battery pack 24, such as battery voltage, battery current, and battery temperature. The battery controller may control various aspects of the battery pack 24 operation.

The vehicle may have at least one controller 44 to manage and control the operation of the various components. The controller may be a Vehicle System Controller (VSC) 44. The VSC 44 may be connected to other controllers via a communications bus (not shown). The VSC 44 may coordinate the operation of the other controllers to achieve vehicle level objectives.

In addition to providing power for propulsion of the vehicle 12, the battery pack 24 may be configured to provide electric power to an external load 42. The external load 42 may be equipment that is off-board the vehicle or may be equipment that is on the vehicle. The external load 42 may be external to the hybrid powertrain. For example, the external load 42 could be a device that is carried by or attached to the vehicle 12 that requires power to be provided by the vehicle 12. This mode of operation is referred to as a plug-out mode of operation. In this mode, energy may be provided for external uses by plugging into the high voltage bus 40 of the vehicle. The engine 18 and electric machine 14 operated as a generator may also be used to provide power from the vehicle 12 in the absence of a demand for propulsive power.

The vehicle 12 may have a plug-out connector module 38 that may enable connection to the high-voltage bus 40. The plug-out connector module 38 may be controlled by a controller such as the VSC 44. The plug-out connector module or port 38 may control the delivery of high-voltage to the external load 42. The plug-out connector module 38 may enable and disable high voltage that is passed to the external load 42. The plug-out connector port 38 may have the capability to selectively connect high voltage from the high-voltage bus 40 to the external load 42. The plug-out connection port 38 may provide a connection point for connecting the external load 42 to the vehicle 12. The port 38 may provide connections for high voltage and for communications between the vehicle 12 and the external load 42. The plug-out connector port 38 may provide an indication to other controllers that an external load 42 is connected to the vehicle 12.

In a plug-out mode of operation, the vehicle 12 may be stationary. The engine 18 may be running to power the electric machine 14 acting as a generator. The following description is based on operating the electric machine 14 as a generator, so the term generator may be used interchangeably with the term electric machine 14 in the following description. The hybrid powertrain may be designed such that one or more of the electric machines 14 may be operated as a generator while the vehicle 12 is stationary. The electric machine 14 operating as a generator converts the mechanical power of the engine 18 into electrical power. The high-voltage bus 40 may be connected to an external device 42 through the plug-out connector port 38. For example, the external load 42 may be an external inverter that converts the DC bus voltage to an AC voltage for driving AC accessories. This mode of operation may require control of the engine 18 and electric machine 14. It may be important to control the on-board components to match the power requirements of the external load 42. Important considerations for the control may be robustness to load variations and fuel efficiency. Such a system should maintain the battery state of charge for driving purposes as well as provide sufficient power to the external loads. The issue becomes one of how to control the engine and generator to provide power to a varying external load in the most fuel efficient manner.

Figure 2:
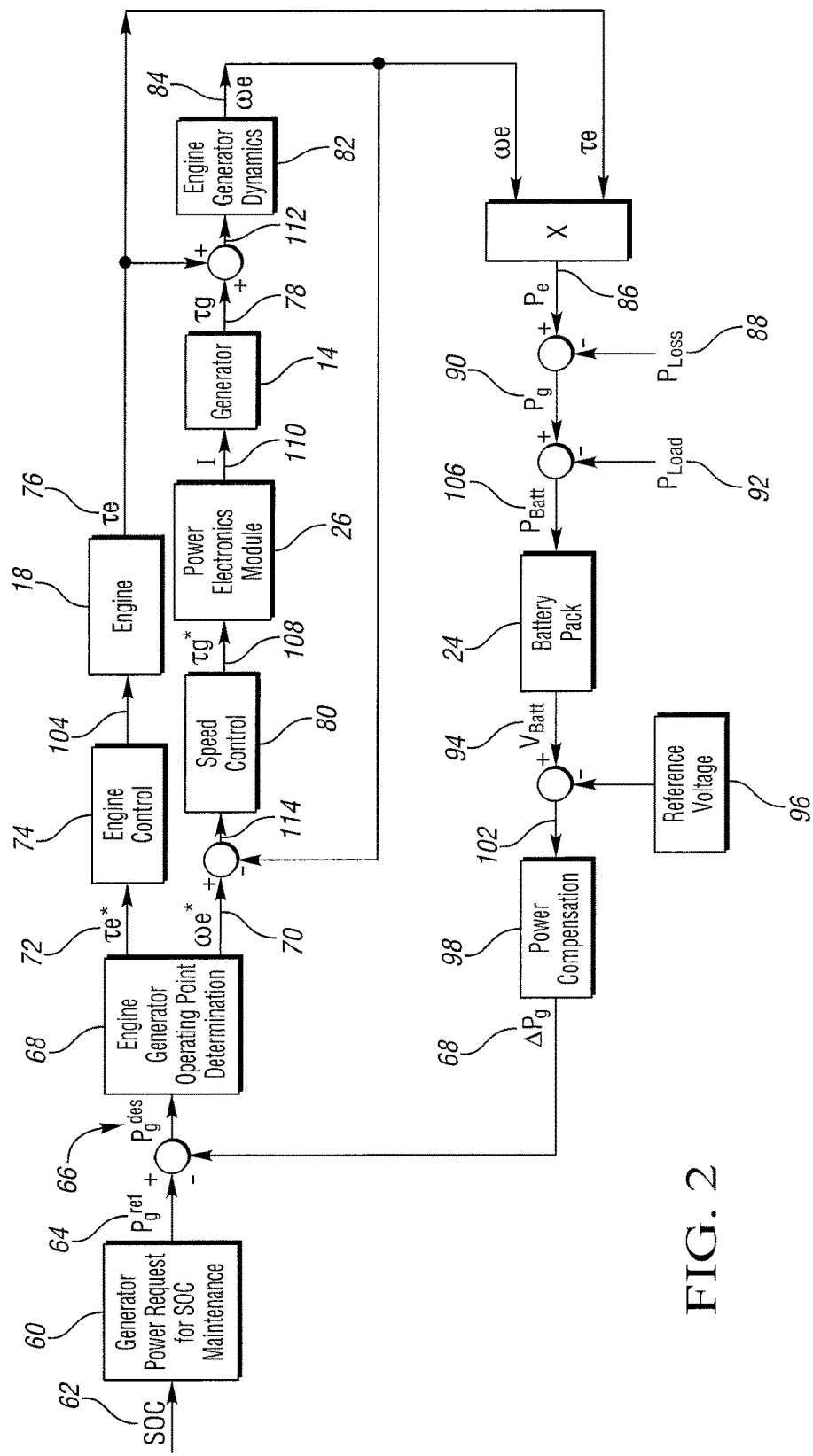
FIG. 2 is a diagram illustrating a possible control scheme for providing power to an external load.

FIG. 2 outlines the various functions that a plug-out mode energy management controller may perform. The functions described may be implemented by one or more of the controllers in the vehicle. One function may be to calculate a generator power request for maintaining the battery state of charge (SOC) 60. The generator power request 64 may be an amount to power to request from the electric machine 14 operating as a generator. The generator power request 64 may be configured to maintain the battery state of charge at a desired level. When the battery state of charge falls below a predetermined value, a request to provide power may be determined. If the battery state of charge is above a predetermined value, a request to provide power from the engine may not be necessary. The generator power request 64 may also be configured to increase or decrease the battery state of charge to a predetermined state of charge value.

To determine the power required to maintain the state of charge at a given level, the present state of charge (SOC) may be input 62. The power required to maintain a particular state of charge may be determined based on test data or analysis. The power required to maintain the battery SOC may take into account the base amount of power required when all necessary modules are powered on to operate in the plug-out mode of operation. A table or equation may be used to calculate a base output power for maintaining the state of charge, $P_g^{ref}$ 64, at a desired level. The desired SOC level to maintain may be the present SOC level. It may also be desired to set the SOC level to be within an optimal range for the battery, in which case, the power output may be set to increase or decrease battery SOC accordingly. The base output power for maintaining the battery state of charge, $P_g^{ref}$ 64, may also be based on a difference between the current battery state of charge 62 and a predetermined state of charge set point.

In a case where an external load is connected, the power required by the load 92 may not be known. The power requirement of the external load, $P_{Load}$ 92, may vary depending on how the external load is operated. It may be desired to adjust the base power level 64 to maintain the battery SOC according to the power drawn by the external load. The base output power, $P_g^{ref}$ 64, may be adjusted for bus voltage variations to account for variations in the external load power 92. A bus voltage compensation value 68 may be subtracted from the base output power, $P_g^{ref}$ 64, to determine an adjusted output power level, $P_g^{des}$ 66. The adjusted output power level 66 may be a power value that is required to satisfy the total power demands.

The engine 18 and generator 14 may be controlled to provide power to the battery pack 24 to maintain the state of charge at a desired level. If the battery SOC is above a predetermined value, it may be desirable to provide the external power requirements from the battery pack 24. In this mode, the engine 18 may be turned off until such time as the battery pack 24 needs to be charged. If the battery SOC is below a threshold, it may be desirable to command generator power to increase the SOC to a desired level. The engine 18 may be operated to always provide power when an external load is connected so that battery SOC is not reduced.

A suitable operating point for the engine 18 and generator 14 may be determined. The desired generator power level, $P_g^{des}$ 66, may be used as an input to determine a desired engine operating point 68. Determination of the engine operating point may require that engine power losses be added to the desired generator power level 66 to compensate for inefficiencies of the engine 18. That is, for a given output power of the generator, the engine may have to provide more power to compensate for mechanical losses of the engine. Additionally, power losses within the power electronics module 26 and the generator 14 may be considered when determining the engine operating point. The engine operating point may be one that minimizes fuel consumption for the given generator power level. The operating point may be defined by a target engine speed, $\omega_e^*$ 70, and a target engine torque, $\tau_e^*$ 72.

When the vehicle is parked and not moving, the engine 18 and generator 14 speeds may be decoupled from the vehicle speed. The engine 18 and generator 14 may be operated at any speed that is allowed by performance constraints (e.g., noise, vibration, and harshness (NVH) constraints). The operating point of the engine 18 and the generator 14 may be selected to minimize fuel consumption of the engine 18. Selection of the engine 18 operating point may take into account the efficiency of the generator 14 and the engine 18.

Figure 3:
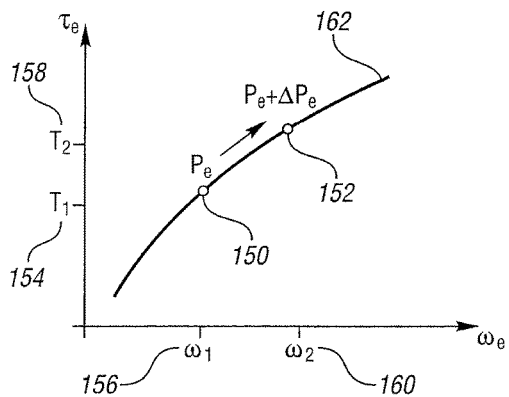
FIG. 3 is a plot illustrating the optimal operating point of the engine.

As the desired output power 66 changes, the operating point may move along an optimal efficiency curve 162 as shown in FIG. 3. The curve shown may be one that optimizes fuel consumption. As an example, the engine may be operating presently at an engine power level, $P_e$ 150, defined by torque level, $T_1$ 154, and engine speed level, $\omega_1$ 156. If the required external load power increases, the engine power level may be increased to support the external load. As the adjusted output power level, $P_g^{des}$ (66 FIG. 2) increases, the power requirement of the engine may increase by an amount $\Delta P_e$. The system may find a new operating point 152 on the optimal efficiency curve 162 that reflects the new required output power level.

If the system is not generating enough power to support the external load, the battery voltage may decrease below a predetermined reference voltage. Referring to FIG. 2, an error 102 between a reference voltage 96 and the battery voltage 94 may be calculated as the difference between the reference voltage 96 and the battery voltage 94. The error 102 may be used to calculate a power adjustment, $\Delta P_g$ 68, that adjusts the power level to provide the external load power. When the battery voltage 94 is below the reference voltage 96, the power adjustment, $\Delta P_g$ 68, may cause an increase in the adjusted output power level, $P_g^{des}$ 66.

The engine power required for a given required generator power may be determined by estimating power losses of the system. A new engine power may be calculated based on the desired generator power level 66. The new engine power may be represented as the sum of the previous engine operating power and a change in engine power, $\Delta P_e$. The engine power calculation may take into account factors such as engine efficiency, electric machine losses, and electrical transmission losses. Referring to FIG. 3, the new engine power value may be used to generate a new operating point 152. The new operating point 152 may be defined by a torque level, $T_2$ 158, and engine speed level, $\omega_2$ 160. Note that since power is the product of torque and speed, there are many possible combinations that could supply the required change, $\Delta P_e$, however, only one such point may exist on the optimal curve 162. The combination selected may be optimized based on specific criteria to minimize fuel consumption of the engine. The engine operating point may be implemented as a predetermined table of values indexed by the desired generator power output.

Referring again to FIG. 2, once an engine operating point (70, 72) is selected, the engine 18 and generator 14 may be controlled to this operating point. The engine 18 may be operated in an engine torque control mode where the engine torque output 76 may be controlled. The engine control 74 may control the engine torque, $\tau_e$ 76, to the target value, $\tau_e^*$ 72 using various methods. The engine torque 76 may be adjusted by controlling a throttle position, a spark retard, or valve timing represented by signal 104. The engine control function 74 may send control signals 104 to the appropriate devices associated with the engine 18 to control the engine 18 operation. The expected result is that the engine will supply a torque 76 to the engine crankshaft.

The generator torque output 78 may be controlled by operating the generator 14 in a speed control 80 mode. In a speed control mode of operation, the electric machine torque 78 may be varied to maintain a target engine speed 70. The engine speed and generator speed may be related by a gear ratio. Knowing the engine speed or the generator speed allows the other speed to be calculated. The engine speed may be measured using a sensor on the engine shaft. The generator speed may be measured using a speed sensor on the generator shaft.

For example, an increase in applied engine torque 76 may rotate the engine shaft which may tend to increase the engine speed and the generator speed. The generator torque 78 will tend to counteract the engine torque to prevent the engine speed 84 from straying from the target speed 70. The effect is that the generator torque, $\tau_g$ 78, will balance the engine torque, $\tau_e$ 76, to maintain the target engine speed 70. The generator torque, $\tau_g$ 78, may be negative when the engine is producing a positive output power. The speed control 80 may operate by adjusting the generator torque, $\tau_g$ 78, based on an error 114 between the commanded engine speed, $\omega_e^*$ 70, and the actual engine speed, $\omega_e$ 84. Alternatively, the commanded engine speed may be converted to a commanded generator speed to generate an error signal in conjunction with the generator speed 84. The generator torque, $\tau_g$ 78, may additionally be adjusted based on an error between a commanded generator torque and the actual generator torque. A proportional and integral (PI) type of control may be used in the speed controller 80. Additional types of controllers may be used with or instead of the PI control to improve the transient speed control behavior or to satisfy other system requirements.

The generator speed control may output a generator torque reference, $\tau_g^*$ 108. The generator torque reference 108 may be processed by the power electronics module 26 to control the generator current 110. The generator 14 may provide a torque 78 that is ideally equal to the generator torque reference 108.

The system may respond to the engine torque 76 and generator torque 78 based on the particular characteristics of the system. The engine-generator dynamics 82 will determine the actual response to the torque inputs. The engine speed, $\omega_e$ 84, will vary based on the sum of the engine torque, $\tau_e$ 76, and the generator torque, $\tau_g$ 78. Generally, the engine speed 84 will increase as the net torque applied 112 (sum of engine torque 76 and generator torque 78) is increased.

The power provided by the engine, $P_e$ 86, may be expressed as the product of the engine torque, $\tau_e$ 76, and the engine speed, $\omega_e$ 84. Since there are losses in the engine due to friction and other loads required to operate the engine 18, the total electrical power generated, $P_g$ 90, may be the engine power, $P_e$ 86 reduced by the additional loads and losses, $P_{loss}$ 88. The losses may also include the efficiency of the generator 14 and power distribution system. The generated electrical power may provide power to the external electrical load, $P_{load}$ 92, and to the battery 24 to maintain the battery state of charge. The net power left 106 for the battery is the difference between the generated electrical power, $P_g$ 90, and the power used by the external load, $P_{load}$ 92.

The power supplied to or provided by the battery pack 24 may affect the battery voltage, $V_{batt}$ 94. Power supplied to the battery 24 may generally increase the battery voltage 94, while power provided by the battery 24 may generally decrease the battery voltage 94. The change in battery voltage 94 provides a mechanism to determine if the system is operating sufficiently to provide power to the external load.

The power supplied may be compensated for bus voltage variations. The external accessory power load 92 required to be provided by the generator system may be unknown. When the load power 92 is increased, more current will be drawn from the high-voltage bus and the bus voltage 94 may drop. To adapt to this variation of power usage, the desired generator output power 66 may be increased until the electric machine 14 can provide enough power so that the bus voltage 94 is maintained at a desired level. The feedback power adjustment 68 can be fed back and combined with the base power request 64. A reference voltage 96 may be subtracted from the present battery voltage, $V_{batt}$ 94, to determine a voltage error 102. A power adjustment, $\Delta P_g$ 68, may be calculated from the voltage error 102. The power compensation 98 may be accomplished by knowing the amount of current provided by or to the battery 24. The power compensation 98 may be implemented as a table or control algorithm within a controller. The power adjustment, $\Delta P_g$ 68, may be fed back to determine the operating point for the engine 18 and generator 14. In another example, the power compensation 98 may be a PI controller that attempts to maintain the battery voltage 94 at the reference value 96. In practice, many control schemes may be utilized to implement the power compensation 98.

Once the power adjustment, $\Delta P_g$ 68, is determined, an optimal operating point comprised of a desired engine torque 72 and engine speed 70 combination can be found. An operating point may be determined that lies on the optimal curve and defines an engine torque 72 and engine speed 70 combination. The operating point may be a point where the least fuel is used for a given power output. Other optimization routines may be implemented as well.

The resulting operation is such that as the external power 92 demanded changes, the operating point of the engine 18 and generator 14 is adjusted to provide power to the external load and to maintain the battery voltage 94 at a given voltage 96. As the power demanded by the external load 92 changes, the battery voltage 94 may increase or decrease in response. The change in battery voltage 94 will cause the operating point of the engine 18 and generator 14 to adjust in order to provide the desired power requested 92 by the external load. An advantage of this configuration is that the power demanded 92 by the external load may be learned by the vehicle. There is no need for the external load to communicate the required amount of power; therefore, any external load may be connected so long as its power requirements are within the limits that the vehicle can provide.

Figure 4:
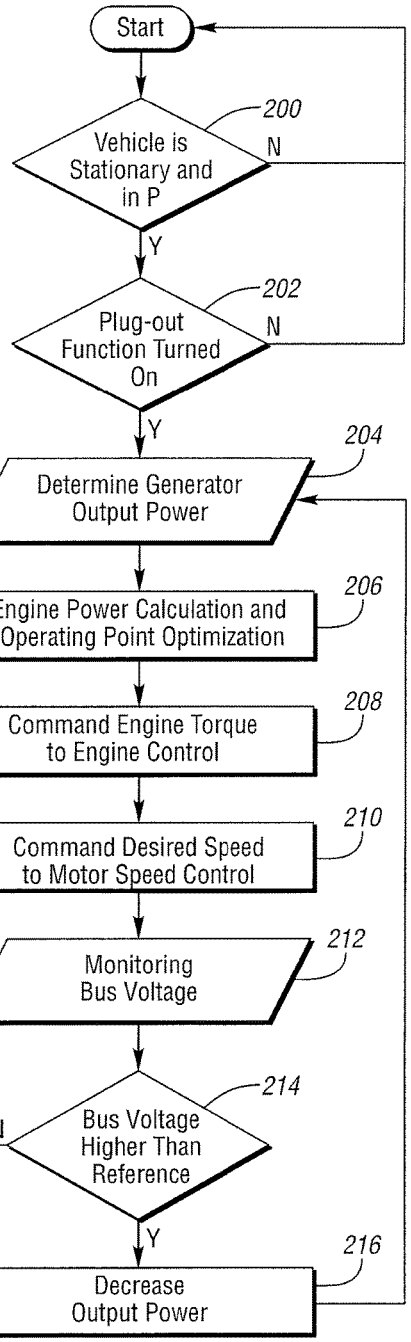
FIG. 4 is a flowchart illustrating a possible implementation of providing power to an external load.

FIG. 4 shows an example of a flow chart for the control decisions of operating the powertrain in a plug-out mode. The logic may be implemented in a controller. A first check may be performed to ensure that the vehicle is in a stationary condition 200. It may be desired to ensure that there is no demand for propulsive power to prevent vehicle movement while an external load is connected. This may be done by monitoring a vehicle speed signal and/or the transmission gear selector position. The controller may determine the vehicle speed by monitoring one or more wheel speed sensors or a transmission speed sensor. The vehicle may be required to be in a park gear or mode to initiate or continue the plug-out mode. One or more of an actual transmission gear and the status of a transmission park mechanism may be monitored. In addition, the plug-out connector module may have associated hardware to detect that a plug is inserted. It may be important to detect that a plug-out connector is inserted to prevent drive-off while providing external power.

The system may then monitor to determine if the plug-out function has been activated 202. This may be by a switch or other indicator that the plug-out function is desired. Activation of the plug-out function may be automatically detected when a load is connected to the external port.

When the vehicle is stationary and in a parked condition and the plug-out function is activated, the electric machine power output level may be determined 204. An estimated power request may be generated or received by the controller. The estimated power request may be calculated to maintain the battery state of charge at a predetermined value. The generator power output level may then be adjusted based on deviations in the high-voltage bus voltage from a desired high-voltage bus reference value.

When the generator power output is known, the engine power may be calculated 206. The engine operating point may be optimized to minimize at least one of fuel consumption, emissions, noise, vibration, and harshness. The engine operating point may define an engine torque and speed combination. Other optimization criteria are possible.

The engine control logic may be commanded to the target engine torque 208. The target engine torque may be communicated to an engine control module to control the torque output by the engine to the target engine torque by any available means. The engine control function may produce actuator commands to cause the engine to produce the requested amount of torque.

The electric machine speed control may be commanded to operate at a target speed 210. The electric machine or engine speed may be communicated to an electric machine speed control module to control the electric machine speed to the target speed. A speed control function may determine the appropriate electric machine torque to maintain the speed set point.

The high-voltage bus voltage may be monitored 212 and compared to a reference value 214. If the bus voltage is greater than a reference voltage value, the power output may be decreased 216. If the bus voltage is below the reference voltage value, the power output may be increased 218. In this manner, the bus voltage attempts to maintain a level near the reference voltage value.

An example of a control algorithm that can control a hybrid-electric vehicle in a plug-out mode under a variable electrical load is disclosed. The algorithm allows the HEV to be operated in a plug-out mode with a variable electric system load. The engine and electric machine system are operated at an optimum point for system fuel efficiency in the plug-out mode. The bus voltage is monitored and the power generation is controlled to maintain the voltage to a reference value at variable system loads. Battery state of charge is maintained while providing electric power to the external load.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a battery including terminals;
   an electric machine; and
   at least one controller programmed to, in response to a difference between a voltage across the terminals and a predetermined reference voltage in the absence of a demand for propulsive power, operate the engine at an operating point selected based on the difference to cause a power output of the electric machine to change the voltage to reduce the difference.

2. The vehicle of claim 1 wherein the operating point is selected such that, for the power output by the electric machine, fuel consumption by the engine is generally minimized.

3. The vehicle of claim 1 wherein the operating point defines a torque command and a speed command for the engine.

4. The vehicle of claim 1 wherein the operating point is further selected based on a state of charge of the battery such that the power output by the electric machine generally maintains the state of charge of the battery.

5. The vehicle of claim 1 wherein the operating point is further selected based on a state of charge difference between a state of charge of the battery and a predetermined state of charge such that the power output by the electric machine reduces the state of charge difference.

6. The vehicle of claim 1 wherein the at least one controller is further programmed to operate the electric machine to cause the engine to rotate at an engine speed defined by the operating point.

* * * * *